United States Patent
Renninger et al.

(10) Patent No.: US 7,201,048 B2
(45) Date of Patent: Apr. 10, 2007

(54) MEASURING DEVICE FOR A FLOW SENSOR, IN PARTICULAR AN AIR MASS SENSOR FOR INTERNAL COMBUSTION ENGINES AND METHOD FOR MEASURING AIR FLOWS

(75) Inventors: Erhard Renninger, Markgroeningen (DE); Uwe Konzelmann, Asperg (DE); Tobias Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/177,101

(22) Filed: Jul. 7, 2005

(65) Prior Publication Data
US 2006/0005619 A1    Jan. 12, 2006

(30) Foreign Application Priority Data
Jul. 8, 2004    (DE)    ................. 10 2004 033 049

(51) Int. Cl.
*G01F 1/68* (2006.01)
(52) U.S. Cl. ................. 73/204.15; 73/204.26
(58) Field of Classification Search ........... None
See application file for complete search history.

(56) References Cited

U.S. PATENT DOCUMENTS

| | | | |
|---|---|---|---|
| 6,840,102 B2* | 1/2005 | Kouno | 73/204.15 |
| 6,981,411 B2* | 1/2006 | Konzelmann et al. | 73/204.26 |

FOREIGN PATENT DOCUMENTS

| | | |
|---|---|---|
| DE | 103 24 292 | 12/2004 |
| EP | 0 955 524 | 11/1999 |
| JP | 02006023304 | * 1/2006 |

* cited by examiner

*Primary Examiner*—Harshad Patel
(74) *Attorney, Agent, or Firm*—Kenyon & Kenyon LLP

(57) ABSTRACT

A measuring device for a flow sensor is provided, in which the drift is minimized.

23 Claims, 4 Drawing Sheets

MEASURING DEVICE FOR A FLOW SENSOR, IN PARTICULAR AN AIR MASS SENSOR FOR INTERNAL COMBUSTION ENGINES AND METHOD FOR MEASURING AIR FLOWS

BACKGROUND INFORMATION

European Published Patent Application No. 0 955 524 describes a flow sensor for ascertaining the air mass drawn in by an internal combustion engine having two heating resistors and two reference temperature sensors. With the aid of the reference temperature sensors, the temperature of the air flowing past the flow sensor is measured before the air flows across the heating resistors. The two heating resistors are used for measuring the air mass flowing across the flow sensor. For this purpose, one makes use of the effect that the first heating resistor in the direction of flow heats the air flowing across it and that as a result the second heating resistor in the direction of flow requires less heating energy than the first heating resistor in order to achieve a specified temperature. The cooling of the first heating resistor in the direction of flow results in a reduced electrical resistance of this heating resistor, while the second heating resistor is cooled only a little by the air heated by the first heating resistor such that the electrical resistance of the second heating resistor, all other initial conditions being equal, is greater than that of the first heating resistor. The air mass flowing past the flow sensor is inferred from the difference between the temperature-dependent resistances of the first heating resistor and of the second heating resistor or from the difference between the heating voltages required to maintain constant (excess) temperatures.

It is further known to assign to each heating resistor a temperature sensor of its own for measuring the temperature of the heating resistor.

Hence in this circuit there are two heating resistors, two temperature sensors and two reference temperature sensors having altogether 2×6=12 terminals. If these 12 terminals are to be accommodated on a chip, then the size of the chip will be predetermined by, among other things, the number of terminals. The costs of a chip depend, among other things, also on its size.

German Published Patent Application No. 103 24 292 describes a measuring device having two heating resistors, two temperature sensors and one reference temperature sensor having altogether six terminals. In this measuring device, both temperature sensors are used to ascertain the air mass flowing across the measuring device.

SUMMARY OF THE INVENTION

The operating method of the measuring element or flow sensor according to the present invention markedly reduces the drift of the measuring element. For it has been shown that in internal combustion engines impure air is drawn in at least for a brief period, primarily by the crankcase ventilation. If these impurities such as oil mists, for example, are deposited on the measuring element, then the impurities may cause an undesired dissipation of heat. In this case, the heating power of the measuring element, which is after all a measure of the air mass, would change such that the air mass signal is falsified.

In the operating mode of the measuring element claimed in accordance with the present invention, a thermal diffusion vortex forming in the combustion air at the first heating resistor situated upstream is utilized to precipitate the impurities in the induced combustion air in the region of the first heating resistor. For this reason, the second heating resistor remains nearly free of impurities throughout its entire service life even in many operating hours. As a consequence, the quality and accuracy of the air mass signal remains constant and of very good quality in the evaluation of the heating voltage at the measuring element according to the present invention. This is achieved by using the voltage between the sixth terminal and the ground terminal, which is at the same time the voltage applied at the second heating resistor, as the output signal of the flow sensor.

These advantages can be realized using the measuring device. A refinement of this measuring device for a flow sensor that is particularly advantageous due to its space-saving design is made up of a ground terminal and five additional terminals, a reference temperature sensor for ascertaining the ambient temperature, the reference temperature sensor being electrically connected to the ground terminal and the first terminal, a first heating resistor, the first heating resistor being electrically connected to the ground terminal and the second terminal, a first temperature sensor, the first temperature sensor being electrically connected to the ground terminal and the third terminal, a second heating resistor, the second heating resistor being electrically connected to the ground terminal and the sixth terminal, and a second temperature sensor, the second temperature sensor being electrically connected to the ground terminal and the fifth terminal.

In addition to the advantages described, the particularly simple connection, in terms of circuit engineering, of the measuring element to a flow sensor must be emphasized with respect to this operating method.

An alternative connection of the measuring element according to the present invention to the electronic evaluation of the circuit of a flow sensor provides for the voltage applied between the ground terminal and the sixth terminal to be the output voltage of the flow sensor if the voltage applied at the second terminal is greater than the voltage applied at the sixth terminal, and otherwise for the voltage applied between the ground terminal and the sixth terminal to be subtracted from a reference voltage and the difference between these voltages to be the output voltage of the flow sensor.

With the aid of this evaluation of the measuring element it is possible to establish return flows in the intake tract of the internal combustion engine in a very precise manner. For this evaluation results in the voltage $U_{H2}$ applied between the ground terminal and the sixth terminal to be converted into an output voltage $U_A$ of the measuring device not only with respect to its magnitude, but also by taking into account the direction of air flow. This just means that the air mass flowing away from the cylinder head in the direction of the intake tract is subtracted from the air mass flowing toward the cylinder head such that the cylinder charge, which is important for metering a fuel quantity to be injected, is measured with very high accuracy. In the process, high-frequency and small pressure pulsations, which can be produced for example by the closing travels of gas exchange valves or other dynamic flow effects, are taken into account as well. This significantly improves the quality of the output signal of a flow sensor equipped with a measuring element according to the present invention.

It has proved to be advantageous to supply the voltage applied between the ground terminal and the sixth terminal and the voltage applied between the ground terminal and the second terminal to a comparator, and to supply the voltage applied between the ground terminal and the sixth terminal as well as a reference voltage to a subtraction element. In addition, the comparator controls an analog multiplexer, the voltage applied between the ground terminal and the sixth terminal being applied at the first input of the analog multiplexer and the difference between the voltages of the sixth terminal and the reference voltage being applied to its second input. This makes it possible in a simple manner first to detect the direction of flow of the air flowing past the measuring element and second to process the output signal or the output voltage in such a way that the output signal is ultimately a measure for the combustion air flowing past the air mass sensor into the cylinder head. This measure is suitable for ascertaining the required fuel injection quantity.

The accuracy of the measuring element according to the present invention or of the air mass sensor equipped with a measuring element according to the present invention is optimized if the reference voltage is equal to the voltage applied between the ground terminal and the sixth terminal when no air flows past the measuring element.

Advantageously, the reference temperature sensor and the first temperature sensor are part of a bridge circuit, particularly a Wheatstone bridge. It is also advantageous if the reference temperature sensor and the second temperature sensor are part of a bridge circuit, particularly a Wheatstone bridge. The fact that the reference temperature sensor is used in the first bridge circuit as well as in the second bridge circuit allows for the number of electrical components and terminals to be reduced without impairing the functionality of the measuring device of the present invention.

Furthermore, it has proved advantageous if a first bridge voltage is applied between the first terminal and the third terminal and the voltage applied at the first heating resistor is controlled as a function of the first bridge voltage.

Analogously, it is advantageous if a second bridge voltage is applied between the first terminal and the fifth terminal and if the voltage applied at the second heating resistor is controlled as a function of the second bridge voltage.

Advantageously, differential amplifiers may be used to control the voltage applied at the first heating resistor and the second heating resistor, it being possible for the bridge circuits to be compensated via the offset voltage of the differential amplifiers or the bridge resistors.

In an advantageous refinement of the present invention, the reference temperature sensor may be made up of a first partial resistor and a second partial resistor connected to it in series.

The method of function of the measuring device of the present invention is improved further if the temperature sensors have a much higher resistance than the heating resistors.

The manufacture of the measuring device of the present invention is simplified if the measuring element has a substrate on which there is a resistance layer, out of which the heating resistors and the temperature sensors are patterned. At the same time, the conductors for contacting and connecting the heating resistors and the temperature sensors may also be patterned out of the resistance layer.

DETAILED DESCRIPTION

Figure 1:
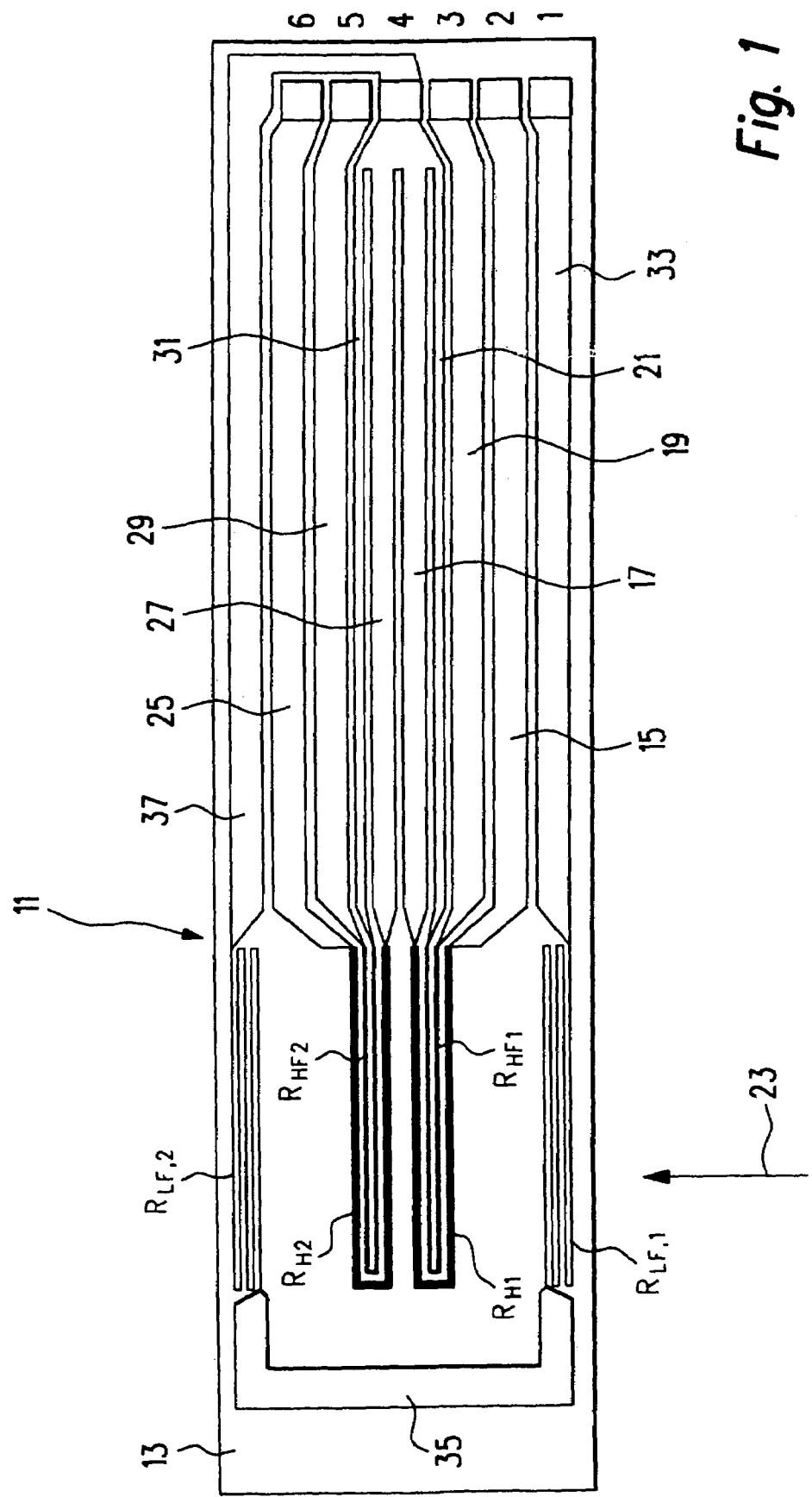
FIG. 1 shows the layout of a measuring element according to the present invention.

FIG. 1 shows a chip 11 on which the measuring element according to the present invention is situated. Measuring element 11 is a part of the circuit of the measuring device of a flow sensor shown in FIG. 2. The integration of measuring element 11 into the circuit of the flow sensor is explained in detail in the following with reference to FIG. 2.

First it must be emphasized that measuring element 11 takes the form of a chip, which in turn is made up of a substrate 13, on which a resistance layer is deposited. The components of measuring element 11 subsequently described in detail are etched out of this resistance layer.

Measuring element 11 has a ground terminal 4, to which all of the components situated on substrate 13 are connected.

A first U-shaped heating resistor R Within first heating resistor $R_{H1}$, a first temperature sensor $R_{HF1}$ is situated. Via a circuit trace 19, first temperature sensor $R_{HF1}$ is connected to the third terminal 3 and, via a circuit trace 21, first temperature sensor $R_{HF1}$ is electrically connected to ground terminal 4.

The direction of flow of the air flowing across measuring element 11, the mass flow of which is to be measured, is indicated in FIG. 1 by an arrow 23.

Downstream of first heating resistor $R_{H1}$, a second heating resistor $R_{H2}$ and a second temperature sensor $R_{HF2}$ are situated. Second heating resistor $R_{H2}$ is electrically connected via a circuit trace 25 to the sixth terminal 6 and via a circuit trace 27 to the ground terminal 4.

Second temperature sensor $R_{HF2}$ is electrically connected via a circuit trace 29 to terminal 5 and via a circuit trace 31 to ground terminal 4.

Circuit traces 21, 17, 27 and 31, which all lead into ground terminal 4, are designed to be as close as possible to ground terminal 4 as separate circuit traces so as to prevent a mutual influencing of the temperature controls of first heating resistor $R_{H1}$ and of second heating resistor $R_{H2}$.

Finally, measuring element 11 also includes a reference temperature sensor $R_{LF}$, which in the exemplary embodiment according to FIG. 1 is made up of two partial resistors $R_{LF,1}$ and $R_{LF,2}$ connected in series. Partial resistors $R_{LF,1}$ and $R_{LF,2}$ are electrically connected via circuit traces 33, 35 and 37 to first terminal 1 and to ground terminal 4.

Of course, reference temperature sensor $R_{LF}$ may also be formed by a resistor (not shown), which then may be situated for example where now circuit trace 35 is situated on substrate 13.

In the following, two possibilities for integrating measuring element 11 into the measuring device of a flow sensor are represented and explained with reference to FIGS. 2 and 3. The identification of the components of measuring element 11 from FIG. 1 was taken over in FIGS. 2 and 3. The same applies to the identification of electrical terminals 1 through 6.

Figure 2:
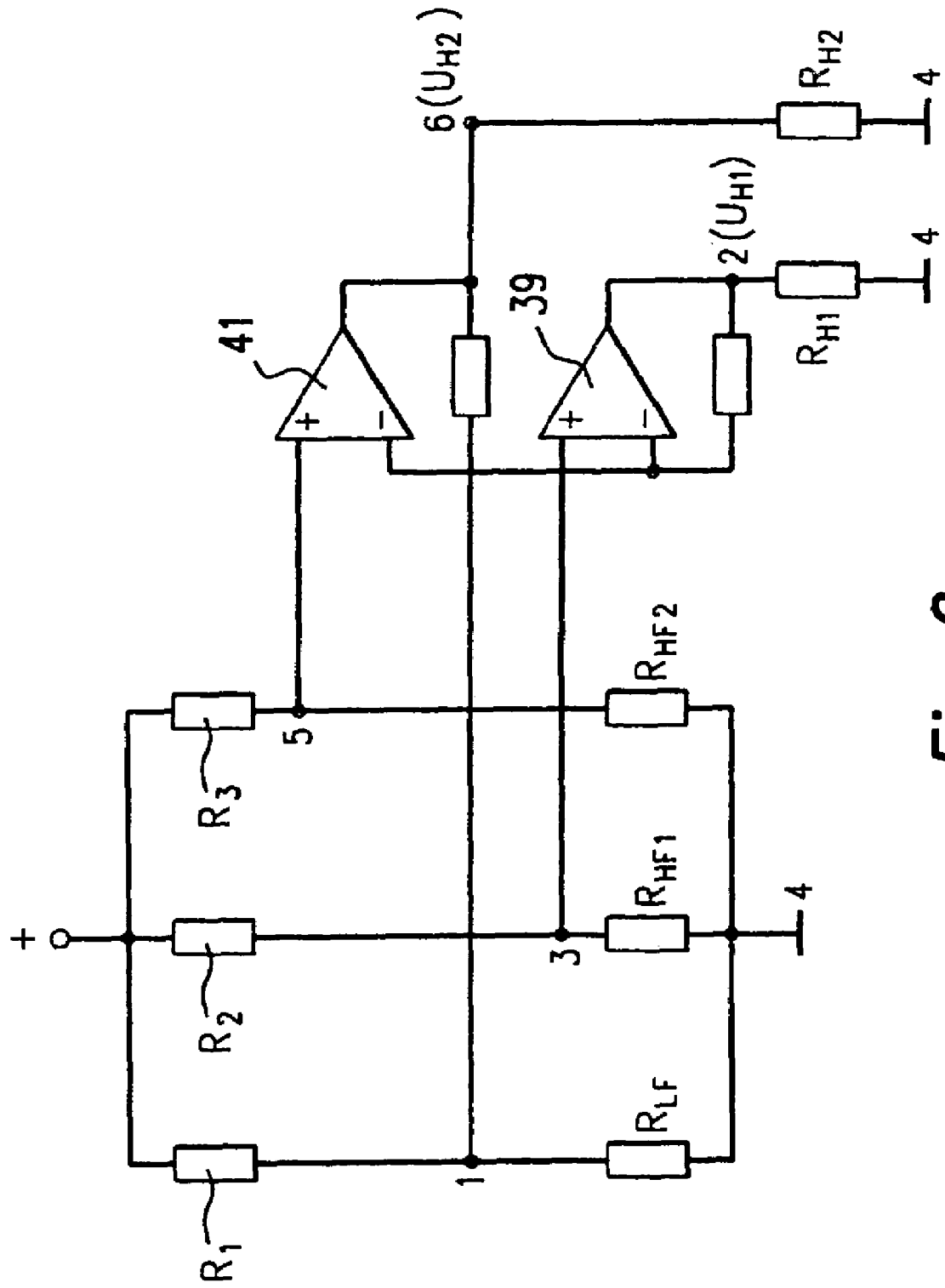
FIG. 2 shows the layout of a first measuring device according to the present invention.

As can be seen from FIG. 2, reference temperature sensor $R_{LF}$ and first temperature sensor $R_{HF1}$ in conjunction with a first bridge resistor $R_1$ and a second bridge resistor $R_2$ form a first Wheatstone bridge, the bridge voltage of which is applied between terminals 1 and 3 of measuring element 11 (see FIG. 1). This bridge voltage is supplied to a first differential amplifier 39 as an input voltage. Output voltage $U_{H1}$ of first differential amplifier 39 is used to control the voltage applied at first heating resistor $R_{H1}$ and thus to control the temperature of first heating resistor $R_{H1}$. Output voltage $U_{H1}$ is applied between terminals 2 and 4 of measuring element 11.

Reference temperature sensor $R_{LF}$ and second temperature sensor $R_{HF2}$ together with first bridge resistor $R_1$ and a third bridge resistor $R_3$ form a second Wheatstone bridge. The bridge voltage of this second Wheatstone bridge is applied at terminals 1 and 5 of measuring element 11 (see FIG. 1). This second bridge voltage is supplied to a second differential amplifier 41 as an input voltage. Output voltage $U_{H2}$ of second differential amplifier 41 is used to control the power of second heating resistor $R_{H2}$. Output voltage $U_{H2}$ is applied between terminals 6 and 4 of measuring element 11.

Now, in a first exemplary embodiment according to the present invention, only output voltage $U_{H2}$ of second differential amplifier 41 is evaluated as output voltage $U_A$ of the flow sensor. This output voltage $U_A$ is the output signal of the flow sensor.

Via the adjustable offset voltages of first differential amplifier 39 and of second differential amplifier 41, the first circuit bridge can be compensated and the second circuit bridge can be compensated. An alternative compensation may occur by the variation of bridge resistors $R_1$, $R_2$ and $R_3$.

The evaluation, according to the present invention, of output voltage $U_{H2}$ of the second differential amplifier as the output signal of the flow sensor markedly raises the insensitivity to drift on the part of the measuring elements according to the present invention or of a flow sensor equipped with this measuring element. For it has been shown that impurities in the induced air flowing across the measuring element are primarily deposited, due to thermal diffusion vortices, at first heating resistor $R_{H1}$ such that this heating resistor is subject to a comparatively strong drift. Now that the heating voltage at the first heating resistor no longer has an influence on the output signal of the measuring element, this drift is suppressed and only the voltage applied at second heating resistor $R_{H2}$, which is very stable with respect to drifting, is used as output signal.

Figure 3:
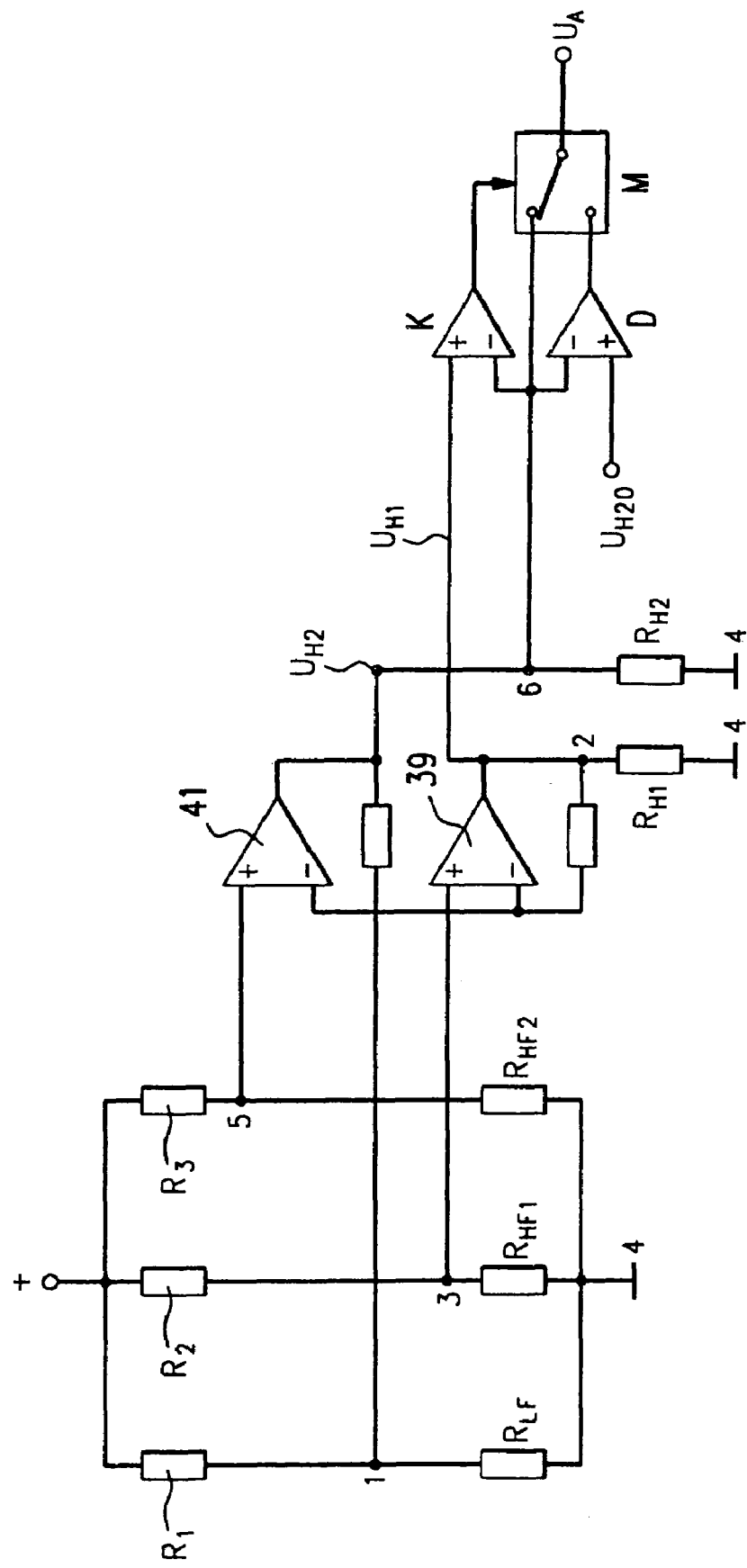
FIG. 3 shows the layout of a second measuring device according to the present invention.

A particularly advantageous refinement and integration of the measuring element of the present invention into the evaluation circuit of a flow sensor is shown by FIG. 3 and is explained in more detail below.

First, however, the influence of changes in direction of the air flowing through an air mass sensor on the measuring result are explained.

In the intake tract of different internal combustion engines, so-called pressure pulsations and return flows occur in the intake pipe as a result of dynamic processes. These pressure pulsations and return flows have the result that a part of the air that has flowed past the flow sensor in the direction of the cylinder head flows back again via the flow sensor into the air filter box of the internal combustion engine. This return flow must be measured if the flow sensor is to make an accurate measurement of the combustion air that has flowed into the combustion chamber. If this return flow were not measured and merely voltage $U_{H2}$ were evaluated as the output signal of the air mass sensor, this would yield the picture shown in FIG. 4: In the time interval 0-$T_1$, the internal combustion engine draws in air, which is reflected in an approximately sinusoidal half wave $U_{H2}$ at the measuring element or at the air mass sensor. Now, if a return flow occurs in the time interval from $T_1$ to $T_2$, then voltage $U_{H2}$ at the measuring element will likewise rise again in an approximately sinusoidal half wave since the air flowing back will also cause second heating resistor $R_{H2}$ to cool. This air quantity that has flowed back, of course, must be subtracted from the previously induced air quantity that has flowed into the cylinder head if the air mass measurement is indeed accurately to measure the combustion air that has flowed into the cylinder head of the internal combustion engine. The evaluation circuit shown in FIG. 3 is used for this purpose. In the process, first the output voltages $U_{H1}$ of first differential amplifier 39 and the output voltages $U_{H2}$ of second differential amplifier 41 are supplied to a comparator K.

If the intake air from the air filter box flows in the direction of the cylinder head of the internal combustion engine, then voltage $U_{H1}$ is greater than voltage $U_{H2}$ since first heating resistor $R_{H1}$ is cooled more heavily than second heating resistor $R_{H2}$. For this reason, heating voltage $U_{H1}$ is connected to the positive input of comparator K, while voltage $U_{H2}$ is connected to the negative input.

If a return flow occurs from the cylinder head in the direction of the air filter box of the internal combustion engine, then second heating resistor $R_{H2}$ is cooled more heavily than first heating resistor $R_{H1}$ such that voltage $U_{H2}$ in this case is greater than voltage $U_{H1}$. In other words: As long as voltage $U_{H1}$ is greater than voltage $U_{H2}$, there is an air flow from the air filter box in the direction of the cylinder head. If the direction of flow is reversed, then voltage $U_{H2}$ is greater than voltage $U_{H1}$.

In order to be able to take this reversal of the direction of flow into account in output voltage $U_A$, voltage $U_{H2}$ of second heating resistor $R_{H2}$ is connected to the negative input of a subtraction element D. A reference voltage $U_{H20}$, which should be kept as constant as possible, is connected to the positive input of this subtraction element D.

The magnitude of this reference voltage $U_{H20}$ is advantageously chosen in such a way that the reference voltage $U_{H20}$ is equal to the voltage $U_{H20}$ applied at second heating resistor $R_{H2}$ when the air above the measuring element according to the present invention is at rest. Voltage $U_{H2}$ and the output variable of subtraction element D are supplied to an analog multiplexer M. This analog multiplexer M is controlled by comparator K.

Now, if voltage $U_{H2}$ is lower than voltage $U_{H1}$, that is, if the combustion air flows from the air filter box in the direction of the cylinder head, then voltage $U_{H2}$ is equal to output voltage $U_A$ and thus to the output signal of the flow sensor according to the present invention.

If there is a return flow from the cylinder head in the direction of the air filter box, then voltage $U_{H2}$ is greater than voltage $U_{H1}$ and the output variable of subtraction element D, that is, reference voltage $U_{H20}$ minus voltage $U_{H2}$ applied at second heating resistor $R_{H2}$, becomes output voltage $U_A$ of the measuring element or of the flow sensor according to the present invention.

Figure 4:
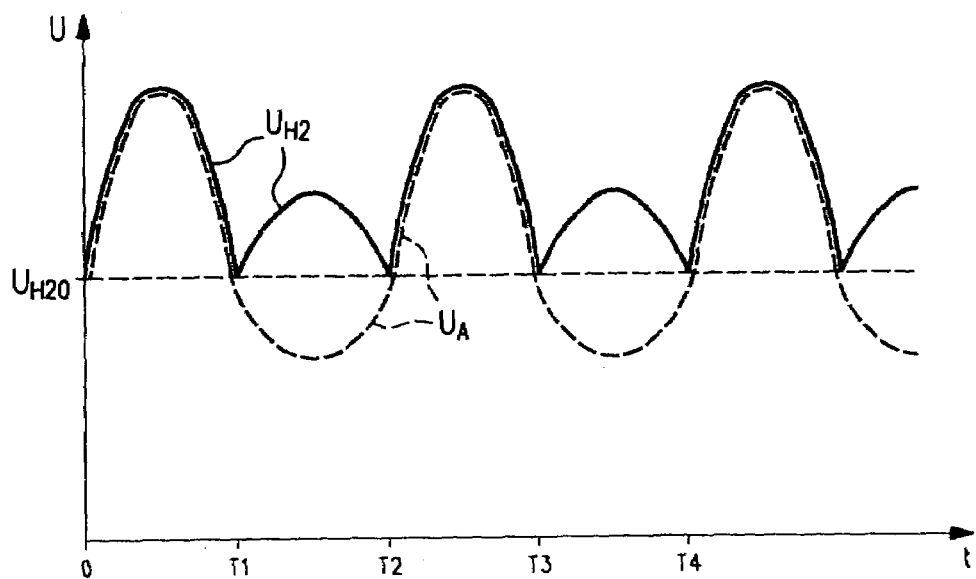
FIG. 4 shows the time characteristic of the output signal of the second measuring device according to the present invention.

The time characteristic of an output signal $U_A$ modified in this manner is shown in FIG. 4 by a dashed line.

This evaluation of the measuring element according the present invention allows for very precise air mass measurements even in intake systems of internal combustion engines in which there are substantial pressure pulsations or return flows of air from the cylinder head in the direction of the air filter box.

Since the output signal of first differential amplifier 39 in accordance with voltage $U_{H1}$ applied to the first heating resistor is only used to determine the direction of flow of the air flowing across the measuring element and not for the quantitative determination of the air mass, the drift of first heating resistor $R_{H1}$ affects output signal $U_A$ only to a very limited extent. This small influence is explained by the fact that only the switching instant of comparator K is somewhat falsified by the drift of the first heating resistor, which, however, due to the naturally low rates of flow at the transition point between the inflow of combustion air and the return flow of combustion air, results only in very slight errors in the determination of the air mass that has flowed into the combustion chamber.

Thus, as a result, the evaluation of the measuring element according to the present invention allows for a very precise and nearly drift-free air mass measurement.

So as further to reduce the sensitivity to drift on the part of the measuring element and of the evaluation electronics of the measuring element, a complete or partial digitalization of the evaluation circuit may be provided.

Figure 5:
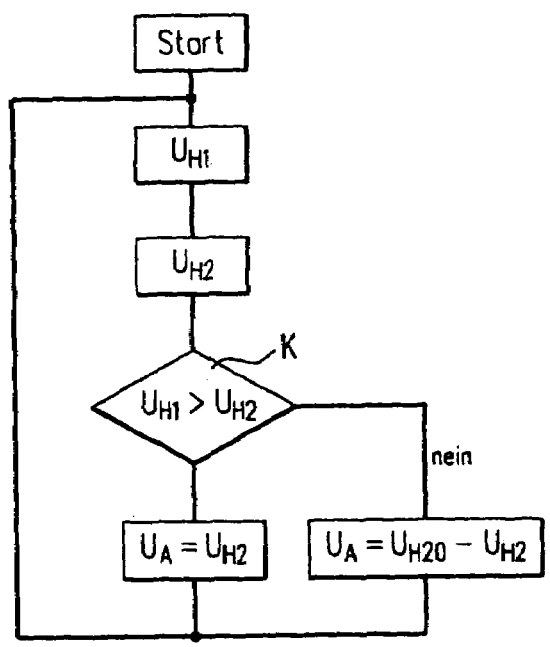
FIG. 5 shows a flow chart of the method according to the present invention.

FIG. 5 shows a flowchart of the method according to the present invention. Following the start, voltage $U_{H1}$ applied to the first heating resistor is ascertained in a first step. In a second step, voltage $U_{H2}$ applied at second heating resistor $R_{H2}$ is ascertained. Subsequently, voltages $U_{H1}$ and $U_{H2}$ are compared. If voltage $U_{H1}$ is greater than voltage $U_{H2}$, then output voltage $U_A$ of the measuring device according to the present invention is equal to voltage $U_{H2}$.

If voltage $U_{H1}$ is lower than voltage $U_{H2}$, then output voltage $U_A$ of the measuring device according to the present invention is equal to reference voltage $U_{H20}$ minus $U_{H2}$.

What is claimed is:

1. A measuring device for a flow sensor, comprising:
   a reference temperature sensor for ascertaining an ambient temperature,
   a first temperature sensor;
   a first heating resistor, a temperature of which is adjusted to a constant value,
   a second temperature sensor; and
   a second heating resistor, a temperature of which is adjusted to the constant value, wherein:
      a voltage applied at the second heating resistor is an output voltage of the flow sensor.

2. The measuring device as recited in claim 1, further comprising:
   a differential amplifier; and
   bridge circuits that are compensated via an offset voltage of the differential amplifier.

3. A measuring device for a flow sensor, comprising:
   a reference temperature sensor for ascertaining an ambient temperature;
   a first temperature sensor;
   a first heating resistor;
   a second heating resistor; and
   a second temperature sensor, wherein:
      a voltage applied at the second heating resistor is an output voltage of the flow sensor if a voltage applied at the first heating resistor is greater than the voltage applied at the second heating resistor, and
      if the voltage applied at the first heating resistor is not greater than the voltage applied at the second heating resistor, the voltage applied at the second heating resistor is subtracted from a reference voltage to produce a difference, and the is the output voltage of the flow sensor.

4. The measuring device as recited in claim 3, further comprising:
   a comparator to which are supplied the voltage applied at the second heating resistor and the voltage applied at the first heating resistor;
   a subtraction element to which are supplied the voltage applied at the second heating resistor and the reference voltage; and
   an analog multiplexer controlled by the comparator, the analog multiplexer including a first input to which the voltage applied at the second heating resistor is applied and a second input to which the difference is applied.

5. The measuring device as recited in claim 3, further comprising:
   a measuring element, wherein the reference voltage is equal to the voltage applied at the second heating resistor if no air flows past the measuring element.

6. The measuring device as recited in claim 3, wherein the reference temperature sensor and the first temperature sensor are part of a bridge circuit.

7. The measuring device as recited in claim 6, wherein the bridge circuit is a Wheatstone bridge.

8. The measuring device as recited in claim 3, wherein the reference temperature sensor and the second temperature sensor are part of a bridge circuit.

9. The measuring device as recited in claim 8, wherein the bridge circuit is a Wheatstone bridge.

10. The measuring device as recited in claim 3, wherein a first bridge voltage is applied between the reference temperature sensor and the first temperature sensor.

11. The measuring device as recited in claim 10, wherein the voltage applied at the first heating resistor is controlled as a function of the first bridge voltage.

12. The measuring device as recited in claim 10, wherein a second bridge voltage is applied between the reference temperature sensor and the second temperature sensor.

13. The measuring device as recited in claim 12, wherein the voltage applied at the second heating resistor is controlled as a function of the second bridge voltage.

14. The measuring device as recited in claim 3, further comprising:
   a differential amplifier by which the voltage applied at the first heating resistor and the voltage applied at the second heating resistor are controlled.

15. The measuring device as recited in claim 3, wherein the reference temperature sensor includes a first partial resistor and a second partial resistor connected to the first partial resistor in series.

16. The measuring device as recited in claim 3, wherein the reference temperature sensor, the first temperature sensor, and the second temperature sensor have a much higher resistance than the first heating resistor and the second heating resistor.

17. The measuring device as recited in claim 3, further comprising:
   a substrate;
   a resistance layer on top of the substrate, out of which the reference temperature sensor, the first temperature sensor, the second temperature sensor, the first heating resistor, and the second heating resistor are patterned.

18. The measuring device as recited in claim 17, further comprising:
   conductors for contacting the reference temperature sensor, the first temperature sensor, the second temperature sensor, the first heating resistor, and the second heating resistor, wherein the conductors are patterned out of the resistance layer.

19. The measuring device as recited in claim 3, wherein the measuring device is used to determine an air mass flow in the flow sensor.

20. A method for measuring an air mass flow, comprising:
   measuring a voltage applied at a first heating resistor;
   measuring a voltage applied at a second heating resistor;

comparing the voltage applied at the first heating resistor and the voltage applied at the second heating resistor; and ascertaining an output voltage as a function of a difference between the voltage applied at the first heating resistor and the voltage applied at the second heating resistor.

21. The method as recited in claim 20, wherein the output voltage is equal to the voltage applied at the second heating resistor if the voltage applied at the first heating resistor is greater than the voltage applied at the second heating resistor.

22. The method as recited in claim 20, wherein the output voltage is equal to a reference voltage minus the voltage applied at the second heating resistor if the voltage applied at the first heating resistor is lower than the voltage applied at the second heating resistor.

23. The method as recited in claim 22, wherein the reference voltage is of equal magnitude as the voltage applied at the second heating resistor if air stands above the second heating resistor.

* * * * *